J. J. PIGGOTT.
Bake-Ovens.
No. 138,042.                        Patented April 22, 1873.
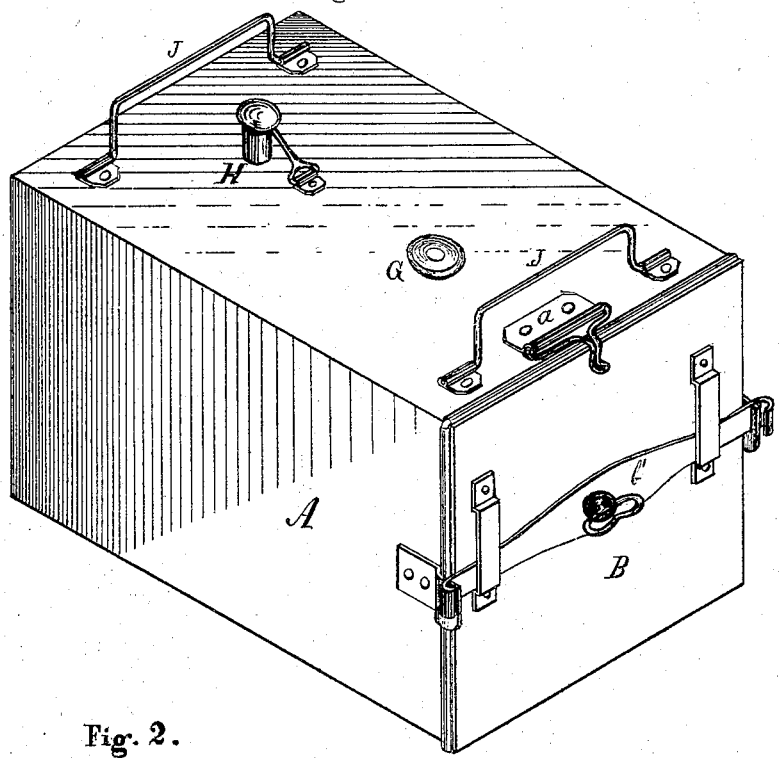
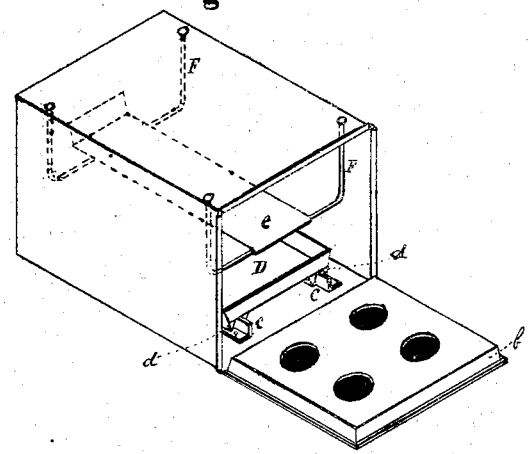
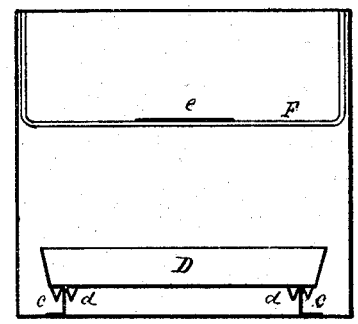
WITNESSES
F. S. Davenport
Chas. D. Moody
INVENTOR
Jabez J. Piggott,
by Moody and Davenport, attys.

UNITED STATES PATENT OFFICE.

JABEZ J. PIGGOTT, OF ST. LOUIS, MISSOURI.

IMPROVEMENT IN BAKE-OVENS.

Specification forming part of Letters Patent No. 138,042, dated April 22, 1873; application filed October 18, 1872.

*To all whom it may concern:*

Be it known that I, JABEZ J. PIGGOTT, of St. Louis, in the county of St. Louis and State of Missouri, have invented a new and useful Improvement in Utensils for Roasting and Baking; and I do hereby declare that the following is a full and exact description of the same, reference being had to the accompanying drawing and to the letters of reference marked thereon.

Figure 1 shows the invention in perspective, the door being closed. Fig. 2 is also a perspective view of the same on a reduced scale. The door is turned down. The arrangement of the supports and pans is shown. Fig. 3 is a central transverse section.

Like letters of like kind refer to like parts.

The invention relates to an improvement in the class of cooking utensils which is used inside of the oven-chamber of cooking-stoves, ranges, &c.; and consists in certain details of construction which will be fully described hereinafter.

In the accompanying drawing, A represents the bake-oven, of shape preferably that of a quadrangular prism, although I do not desire to be limited to the precise form shown. B represents the door by which the oven is closed. It is arranged at one of the ends of the oven. It is provided on its inside, and near its edges, with a flange, $b$, for the purpose of forming a close joint when the door is closed. The hook $a$ and the latch $b'$ serve to securely fasten the door. $c\ c$ represent supports consisting of strips attached to the bottom of the bake-oven. They are arranged at right angles to the door B. Their height is sufficient to secure a suitable air-space beneath the pan containing the eatables. D represents a pan, and $e$ a plate, adapted to sustain a pan to hold the eatables while being cooked. The lower one, D, is provided on its bottom with suitable guide-pieces $d\ d$, that correspond in position with the supports $c\ c$, and serve to hold the pan D upon the supports. To accomplish the same purpose, the bottom of the pan D can be corrugated, the supports $c\ c$ engaging in the corrugations. The upper pan rests upon the plate $e$, or upon the supports F F, attached to the roof of the bake-oven, and depending sufficiently therefrom to afford room for the pan and its contents. The plate or strip $e$ also serves to connect the supports and hold them in position. G represents the safety-valve, preferably attached to the top of the oven. It can be held down by gravity or a slight spring. H represents an indicator, also preferably attached to the upper side of the utensil. J J represent handles, by which the oven is lifted. They are attached to the upper side.

To operate the invention, the articles to be cooked are placed in the pans D and E, which are slid into the bake-oven A, resting, respectively, on the supports $c\ c$ and the supports F F. The door is then securely fastened, and the whole placed in the oven-chamber of the stove, there to remain until the completion of the operation. Large and heavy articles are placed below in the pan D, the upper pan being intended to receive the lighter articles.

By means of the swell in the flange of the door B it can be made tight. Owing to the tightness of the utensil the juices of the eatables cannot be dissipated and wasted, and, by reason of its closeness and strength, the requisite degree of heat for cooking can be maintained with a very considerable saving in fuel over the ordinary expense. Further, a higher degree of heat can be maintained without injuring the food when the juices are retained, as described, thus enabling it to be cooked in less than the usual time. Should smoke or gas have entered the oven-chamber of the stove, it will be prevented, by the closeness of the utensil and the pressure from within outward, from injuring the food. By providing an air-space and circulation all around the eatables an almost perfect evenness of cooking is insured. In addition to the saving in time and fuel, the food is rendered more tender, palatable, and nutritious. Further, the utensil is not only adapted to roasting meats, browning coffee, and baking bread, pastry, apples, potatoes, and other vegetables, but is peculiarly fitted for the operation in cooking termed "smothering," for the vapors as they arise are checked, condensed, and returned to the eatable, obviating the need of basting.

When the pressure within the oven becomes excessive, it is relieved by the operation of the valve G. The degree of pressure is shown by the indicator H.

What is claimed is—

1. The bake-oven A, provided with the supports $c\ c$, in combination with the pan D, provided with the guides $d\ d$, all arranged and operated as specified.

2. In a bake-oven, constructed and operated as described, a safety-valve, G, substantially as described and shown.

3. In a bake-oven, constructed and operated as set forth, an indicator, H, substantially as described.

This specification signed and witnessed this 5th day of October, 1872.

JABEZ J. PIGGOTT.

Witnesses:
 CHAS. D. MOODY,
 F. S. DAVENPORT.